Dec. 16, 1969   L. F. NILSSON   3,483,936
VEHICLES FOR ROAD FREE CONDITIONS
Filed Feb. 13, 1967   2 Sheets-Sheet 1
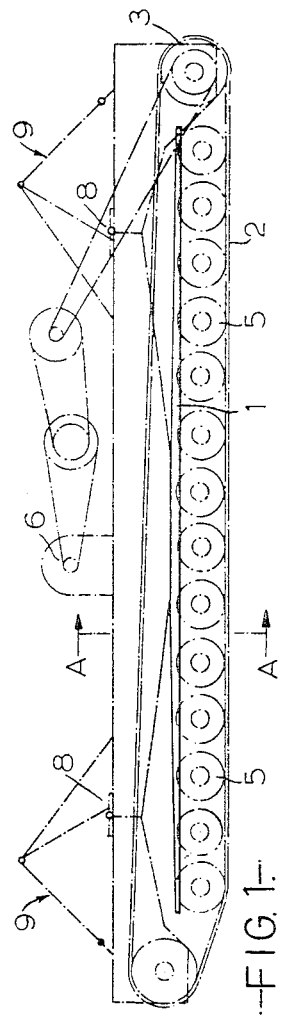
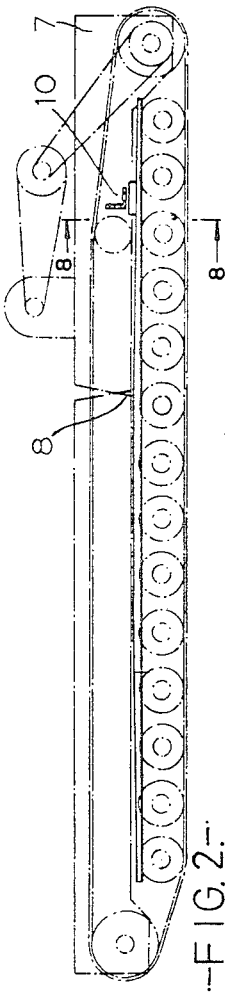
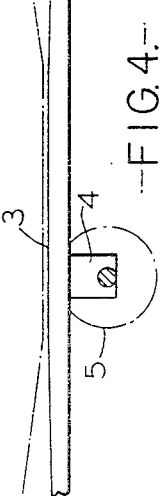
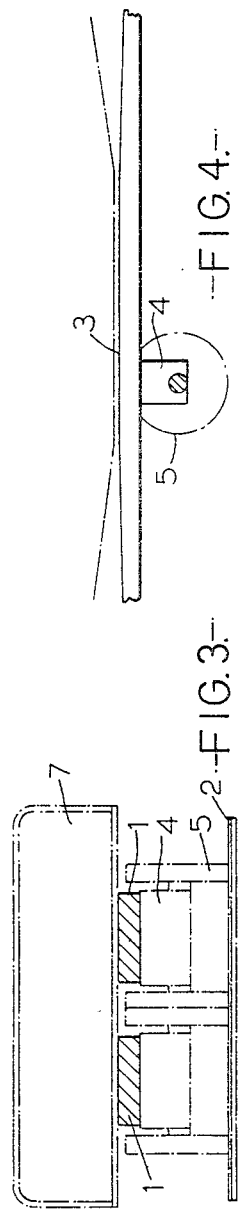
INVENTOR:
LENNART FOLKE NILSSON
BY
Kenyon & Kenyon
ATTORNEYS Dec. 16, 1969  L. F. NILSSON  3,483,936
VEHICLES FOR ROAD FREE CONDITIONS
Filed Feb. 13, 1967  2 Sheets-Sheet 2

INVENTOR.
LENNART FOLKE NILSSON

United States Patent Office 3,483,936
Patented Dec. 16, 1969

3,483,936
VEHICLES FOR ROAD FREE CONDITIONS
Lennart Folke Nilsson, Radhusgatan 62,
Ostersund, Sweden
Filed Feb. 13, 1967, Ser. No. 615,635
Int. Cl. B62m 27/00; B62d 55/00, 55/14
U.S. Cl. 180—5                                            6 Claims

ABSTRACT OF THE DISCLOSURE

The snow-scooter is mounted by means of a pair of skis which distributes the load uniformly on a plurality of resiliently mounted supporting wheels which are free to pivot. The supporting wheels in turn press against an endless tread which serves to propel the snow-scooter over snow. The chassis of the scooter is formed with hinged sections to adapt to various ground contours.

---

The present invention relates to an improvement in vehicles for road free conditions, particularly so-called "snow-weasels" or "snow-scooters" having one or more driven endless tread bands extending over turning rollers at the front and rear portion of the vehicle and further comprising supporting means engaging towards the lower run of the tread band and being in a form of for instance supporting rollers, engaging members or supporting rails.

It has appeared to be difficult in such known vehicles to obtain a substantially even distribution of the weight of the part of the vehicle such as the chassis, the motor and mechanical equipment and the load against the supporting means and the tread bands. According to the present invention this desired effect has been obtained by means of an arrangement which in essence is characterised by one or more resilient ski means extending in the longitudinal direction of the vehicle and having the middle portion arranged to support the upper part of the vehicle together with the load in order to distribute this weight over the ski means to the supporting means and tread bands.

Further features of the invention will appear nearer from the following description with reference to the accompanying drawing, which diagrammatically shows some embodiments of the invention, and in which:

FIG. 1 is a lateral view, partly in section, of a so-called "snow-scooter" according to invention, provided with an arrangement according to the invention.

FIG. 2 is a similar view of another embodiment.

FIG. 3 is a cross-sectional view taken along the line A—A of FIG. 1.

FIG. 4 is an enlarged view of a detail.

Figure 8:
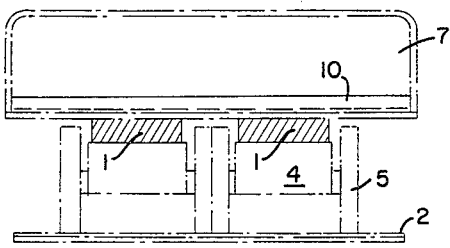

FIG. 8. illustrates a view taken on line 8—8 of FIG. 2.

In the drawing, reference numeral 1 designates a resilient ski-like beam according to the invention, which may be manufactured from wood, metal, plastics material, and which may be reinforced with reinforcements of a suitable material, such as metal, fibre glass, etc.

The length, the width and the thickness of the resilient ski-like beam may vary all according to the size of the vehicle and the load and the resilience which is desired.

The embodiment shown in FIG. 1 is provided with two longitudinal ski-like beams 1, see also FIG. 3, and two rows of pairs of supporting wheels, 5, which are freely rotatable about shafts vulcanised to rubber blocks 4 which in turn are secured in a suitable manner, for instance by bonding, to the respective ski-like beams 1.

The supporting wheels 5 engage towards the lower run of an endless tread band 2, which in this case is common to both ski-like beams and pairs of supporting wheels. Mounted at both ends of the vehicle are turning rollers 3, the rear one of which is driven by a motor 6 supported by the chassis 7 of the vehicle. As will appear from FIGS. 1 and 4, the chassis of the vehicle engages towards the middle portion of the ski-like beams, which thus supports the entire upper part and the load. Consequently, the load is evenly distributed over the entire length of the ski-like beams via the supporting means 5 of the vehicle to the tread bands 2.

It is further shown in FIG. 1 that the chassis is divided in the longitudinal direction at links 8 allowing a better adaptation to the ground. In this regard, it is noted that the links 8, for example, as shown, hinge separate parts of the chassis to each other so as to allow the various parts to pivot with respect to the others when moving over a contoured ground surface. The links 8 can be in the form of known hinges (FIG. 1) or can be in the form of hinged linkages (FIG. 2). The arrangements 9 shows simplified how the outer chassis portions can be resiliently supported by the middle portion of the chassis.

In FIG. 2 there is shown a similar embodiment disclosing however that the chassis is divided in two parts by a link 8. A crosswise extending rail 10 serves as an engagement limiting the movement of the rear portion downwards, the rail 10 being also useful for imparting the corresponding portion of the rail or a concave or convex curvature further improving adaptation of the vehicle to the ground, increasing its tractive force and its climbing properties.

Referring to FIGS. 2 and 8, the rail 10 is fixed to the chassis 7 at the rear portion so as to be located above the resilient ski-like beam 1 which is fixed to the central part of the vehicle and not to the rear portion. In addition, the rail 10 is disposed under the upper run of the endless tread band 2. Thus, should the rear chassis portion move in a counterclockwise direction as viewed in FIG. 2, that is, upwardly, with respect to the main chassis portion, the resilient ski-like beam 1 will abut the rail 10 and therefore will limit the upward movement of the rear chassis portion. In a similar manner, should the rear portion tend to move downwardly, the upper run of the endless tread 2 would contact the rail and thus the downward movement of the rear portion would be limited.

Figure 7:
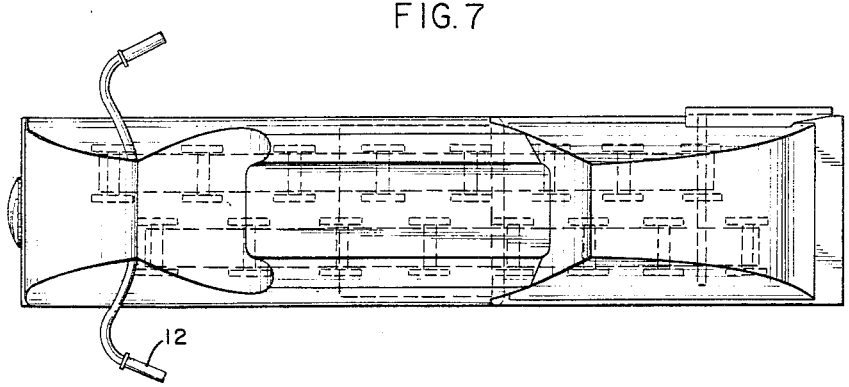
FIG. 7 illustrates a top view of the vehicle of FIG. 5.
Figure 5:
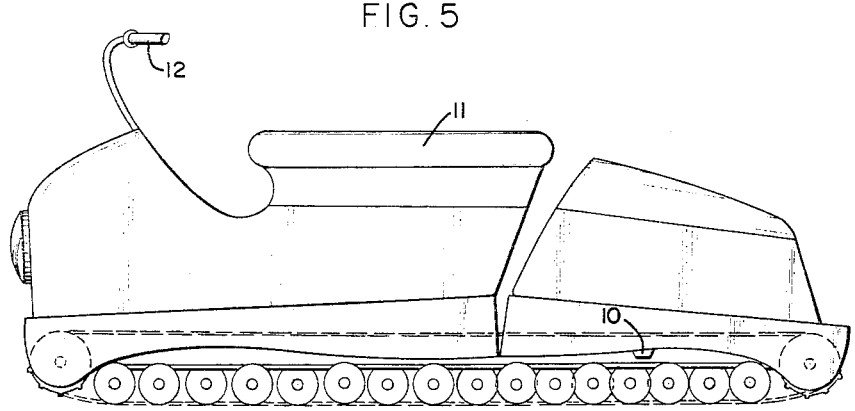
FIG. 5 illustrates a side view of a snow vehicle according to the invention.
Figure 6:
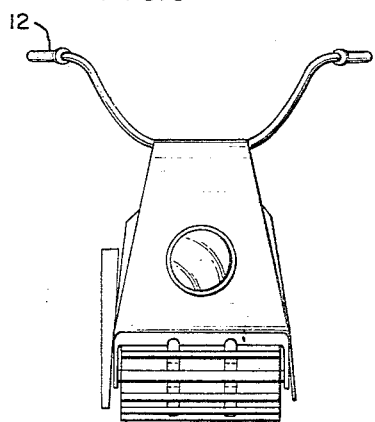
FIG. 6 illustrates a front view of the vehicle of FIG. 5.

Referring to FIGS. 5, 6 and 7, the vehicle is shown with an occupant receiving portion on the top surface 11 as well as with a pair of handle bars 12 for steering of the vehicle as is known. Since this structure is conventional, no further need is believed to be necessary to describe such.

In both embodiments the number of ski-like beams and tread bands or tracks may vary, the number being selected with a view to the resilience, supporting properties and torsional stability of the ski-like beams, and the like. Corrsepondingly, the number of the supporting wheels or supporting rails and the shape and dimensions of the supporting blocks 4 is selected all according to the requirements to the vehicle.

The upper portion of the tread bands may be arranged within the chassis as will appear from FIGS. 1 to 2, and the band or bands may be provided with suitable supporting rollers, one of which being shown in FIG. 2.

What I claim is:
1. A snow scooter vehicle comprising
   an elongated chassis for supporting a rider,
   at least one resilient ski-like beam flexible longitudinally and extending longitudinally of said chassis from front to rear and having a middle portion secured in supporting relation to the underside of said chassis for uniformly distributing the load of said chassis longitudinally to the underside thereof, closely spaced supporting roller means mounted along and throughout the length of said underside of said ski-like beam and their lower peripheries in a substantially horizontal plane to receive the load of said chassis uniformly, and a driven endless tread band extending around said roller supporting means and having a lower run engaging said supporting means for receiving the uniformly distributed load therefrom.

2. A vehicle as set forth in claim 1 wherein said supporting means is resiliently mounted on said ski-like beam.

3. A vehicle as set forth in claim 1 wherein said supporting means includes a plurality of pairs of supporting wheels spaced along said ski, each said pair of supporting wheels including a common shaft rotatably mounting said wheels and a resilient block resiliently mounting said shaft to said ski-like beam to permit pivoting of said wheels with respect to said ski-like beam.

4. A vehicle as set forth in claim 1 wherein said chassis is divided into a plurality of parts, each said part being pivotally connected to an adjacent part.

5. A vehicle as set forth in claim 1 further comprising means for limiting the downward movement of at least one of said parts towards said ski-like beam.

6. A vehicle as set forth in claim 1 comprising a pair of said ski-like beams wherein said endless tread band extends around each of said ski-like beams.

References Cited

UNITED STATES PATENTS

| | | | |
|---|---|---|---|
| 1,474,749 | 11/1923 | Wickersham | 305—25 |
| 1,571,628 | 2/1926 | Hendrickson | 305—27 |
| 3,285,676 | 11/1966 | Hetteen | 305—27 |
| 2,277,281 | 3/1942 | Vinton | 280—11.13 |
| 3,221,830 | 12/1965 | Walsh | 180—5 |

FOREIGN PATENTS 610,777    12/1960    Canada.

RICHARD J. JOHNSON, Primary Examiner

U.S. Cl. X.R.

180—9.24; 305—28